United States Patent [19]

Kramer

[11] Patent Number: 4,875,465
[45] Date of Patent: Oct. 24, 1989

[54] HIGH EFFICIENCY SUBMERSIBLE CHAMBER WATER HEATER

[75] Inventor: David W. Kramer, Milwaukee, Wis.

[73] Assignee: A. O. Smith Corporation, Milwaukee, Wis.

[21] Appl. No.: 195,285

[22] Filed: May 16, 1988

[51] Int. Cl.⁴ ............................................. A47J 27/00
[52] U.S. Cl. ..................................... 126/391; 126/378; 126/344; 122/149; 122/182 R
[58] Field of Search ................... 126/378, 110 R, 391, 126/392, 344; 122/142, 149, 182 R, 182 T, 367, 182 S; 431/19

[56] References Cited

U.S. PATENT DOCUMENTS 2,069,956  2/1937  Kelley .......................... 122/182 R X
4,651,714  3/1987  Granberg .

Primary Examiner—Larry Jones
Attorney, Agent, or Firm—Andrus, Sceales, Starke & Sawall

[57] ABSTRACT

A submersible chamber water heater having improved efficiency. The water heater includes a tubular member that is mounted in an opening in the tank and defines a combustion chamber. A fuel-air mixture is supplied to a burner located within the combustion chamber and the waste gases of combustion are conducted from the combustion chamber into a series of heat exchanger tubes which are positioned beneath the combustion chamber and are then discharged to a flue. A conduit extends through the combustion chamber and the ends of the conduit communicate with the interior of the tank. One end of the conduit is at a higher level than the other, so that water flows by convection through the conduit to increase the efficiency of the heating operation.

7 Claims, 2 Drawing Sheets

HIGH EFFICIENCY SUBMERSIBLE CHAMBER WATER HEATER

BACKGROUND OF THE INVENTION

In a conventional gas-fired water heater, the gas burner is located beneath the lower head of the tank and waste gases of combustion are discharged from the burner through one or more vertical flues that extend upwardly through the tank. When the water heater is not in operation, there will be a flow of air by convection through the flues, with the resulting transfer of heat from the heated water in the tank to the air passing upwardly through the flues. This can result in considerable heat loss during standby periods.

The typical gas-fired water heater also normally includes a draft hood, which acts to prevent blow-out of the pilot light due to downdrafts. The use of a draft hood can also result in considerable heat loss from the building, because heated air from the building can continually flow by convection through the draft hood and the flue to the exterior.

In an attempt to increase the efficiency of the water heater, submersible chamber water heaters have been developed. With heaters of this type, the burner, instead of being mounted below the lower head, is positioned in a closed combustion chamber located within the lower portion of the tank. Waste gases are forced through or withdrawn from the combustion chamber by a blower and can be directly discharged to the atmosphere.

U.S. Pat. No. 4,651,714 describes a submersible chamber water heater, including a tubular member that is mounted in an opening in the side of the tank and extends horizontally across the lower portion of the tank, defining a combustion chamber. An elongated burner is positioned within the combustion chamber and the waste gases of combustion generated by igniting a fuel-air mixture are discharged from the inner end of the tubular member and are directed into a series of heat exchange tubes, which are positioned beneath the combustion chamber. The outer ends of the heat exchanger tubes extend through the wall of the tank and communicate with a collector which is connected to a flue. The water heater, as described in U.S. Pat. No. 4,651,714 provides improved efficiency for the water heating operation and minimizes stacking or stratification of the water within the tank.

SUMMARY OF THE INVENTION

The invention is directed to a submersible chamber water heater having improved efficiency. In accordance with the invention, the heating unit comprises a generally horizontal tubular member, which is preferably mounted within an opening in a side wall of the tank and is located in the lower portion of the tank, such as the cylindrical shell of the tank. The tubular member defines a combustion chamber and a short flame, power gas burner, is mounted within the outer end of the combustion chamber.

The waste gases of combustion generated by igniting a fuel-air mixture in the burner are deflected downwardly by a dome-shaped deflector into the inner ends of a plurality of generally parallel heat exchanger tubes that are located beneath the combustion chamber. The waste gases being discharged from the heat exchanger tubes flow into a collector, which is connected to a flue or stack.

To increase the efficiency of the heat transfer operation, a conduit extends through the combustion chamber and the ends of the conduit communicate with the interior of the tank. In one form of the invention, the conduit is generally L-shaped in configuration, having a horizontal leg that extends longitudinally within the combustion chamber with one end of the horizontal leg being mounted within an opening in the dome-shaped deflector and defining an inlet. The conduit also includes a vertical leg connected to the inner end of the horizontal leg and the upper end of the vertical leg is mounted within an opening in the side wall of the tubular member. With this construction, one end of the conduit is at a higher level than the other, so that water flows through the conduit by convection to increase the efficiency of the heat transfer operation.

In a second form of the invention, the conduit is generally T-shaped, having a vertical leg that extends vertically through the combustion chamber and a horizontal leg that is connected to the vertical leg and extends longitudinally of the combustion chamber.

With this arrangement, water will flow by convection upwardly through the vertical leg, as well as flowing through the horizontal leg and then into the vertical leg for exit at the upper end of the vertical leg.

It is also contemplated that in some installations the water inlet line for the tank can be positioned in direct alignment with the horizontal leg of the conduit, so that during water draws, the incoming cold water is directed into the horizontal leg.

By the convection flow of water through the conduit in the combustion chamber, a substantial increase in efficiency is obtained for the water heater.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
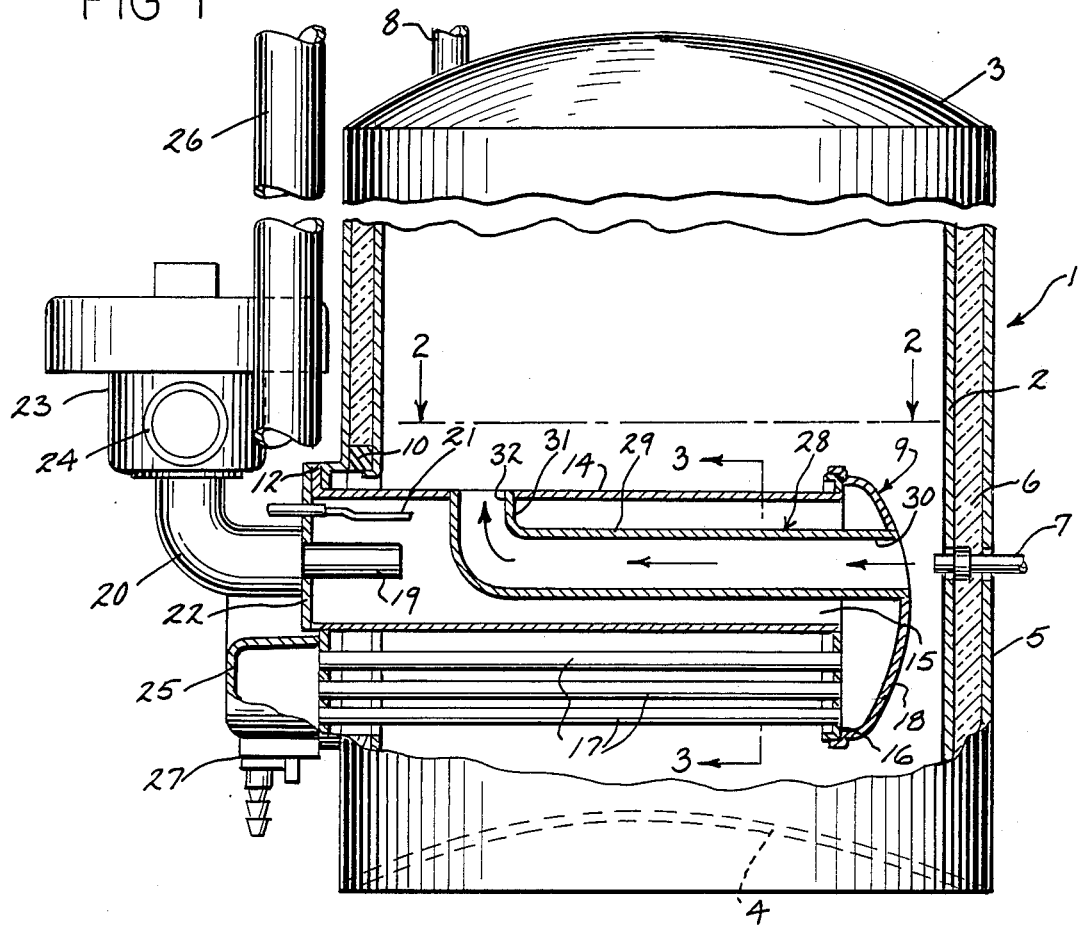
FIG. 1 is a side elevation of a water heater incorporating the heating unit of the invention with parts broken away in section.
Figure 2:
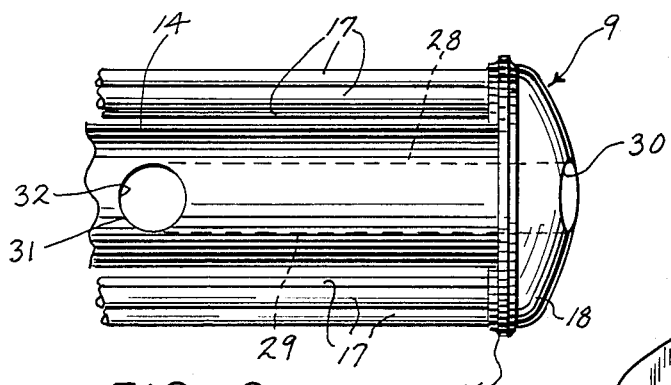
FIG. 2 is a section taken along line 2—2 of FIG. 1.
Figure 3:
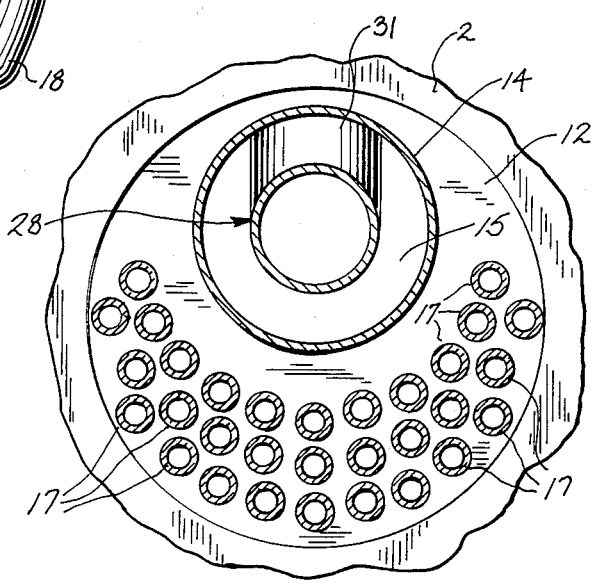
FIG. 3 is a section taken along line 3—3 of FIG. 1.

FIGS. 1–3 illustrate a water heater 1, composed of a generally cylindrical steel tank 2, which is enclosed at its upper end by an upper head 3 and at its lower end by a lower head 4. To prevent corrosion of the tank, the inner surfaces of the tank 2, as well as heads 3 and 4, can be coated with a layer of a corrosion resistant material, such as glass or porcelain enamel, not shown.

An outer jacket 5 is spaced outwardly from the tank 2 and upper head 3 and a layer of insulating material 6, which can be a fibrous or foam-type insulation, is located in the space between the jacket 5 and tank 2 and head 3.

Cold water to be heated is introduced into the lower portion of the tank through an inlet 7, while heated water is withdrawn from the upper end of the tank through an outlet 8.

The water in tank 2 is heated by a heating unit indicated generally by 9, which is mounted in an opening in the cylindrical tank 2 and positioned above lower head 4.

To mount the heating unit 9 in tank 2, a reinforcing ring 10 is welded to an outwardly extending flange that borders an opening in tank 2. Heating unit 9 includes a mounting plate 12 which is secured to the reinforcing ring 10 through a series of circumferentially spaced bolts, not shown, and mounted within an opening in mounting plate 12 is a tubular member 14 which defines a combustion chamber 15. Tubular member 14 extends horizontally across the lower portion of tank 2 and the inner end of tubular member 14 is welded within an opening in end plate 16.

A plurality of heat exchanger tubes 17 are positioned beneath tubular member 14 and are welded within aligned openings in mounting plate 12 and end plate 16. As shown in FIG. 3, the heat exchanger tubes 17 are disposed in parallel relation and the bundle of tubes extends approximately 180° around the tubular member 14.

Heating unit 9 also includes a generally dome-shaped end deflector 18, which is secured to the peripheral edge of end plate 16 and the waste gases of combustion are directed from the combustion chamber 15 by the deflector ito the heat exchanger tube 17.

A short flame power gas burner 19 is mounted in the inner end of combustion chamber 15 and an air fuel mixture is supplied to burner 19 through a supply tube 20. The fuel air mixture can be ignited by a conventional igniter 21 that is mounted within an opening in mounting ring 22. Blower 23 is connected to the outer end of supply tube 20 and gas supply tube 24, which is connected to a suitable source of gas, is connected to the blower. With this construction, the air being delivered by blower 23 will be mixed with the fuel delivered through supply line 24 and the mixture delivered to the burner will be ignited by igniter 21.

The waste gases of combustion are directed from the combustion chamber 15 by deflector 18 into the heat exchanger tubes 17 where additional heat will be transferred from the waste gases to the water in tank 2. The gases being discharged from heat exchanger tube 17 flow into a collector 25, which is attached to mounting ring 12 and a flue or stack 26 is connected to the collector and the waste gases are discharged through the flue to the atmosphere.

In addition, a condensate trap 27, similar to that described in U.S. Pat. No. 4,651,714, can be connected to the lower end of collector 25 to discharge or drain condensate while preventing the waste gases of combustion from passing through the trap to the atmosphere.

To improve the efficiency of the heating operation a conduit 28 is disposed within the combustion chamber 15. As illustrated in FIGS. 2 and 3, conduit 28 can be generally L-shaped, composed of a horizontal leg 29, which extends longitudinally of combustion chamber 15, and the outer end of the leg 29 is secured within an opening in the deflector 18 and defines an inlet 30.

Conduit 28 also includes a vertical leg 31 which is connected to the inner end of horizontal leg 29 and the upper end of vertical leg 31 is mounted within an opening in the wall of tubular member 14 and defines an outlet 32. The inlet 30 and outlet 32 of conduit 28 communicate with the interior of the tank and are out of communication with the combustion chamber 15. As the outlet 32 is located at a higher level than the inlet 30, water in the tank will flow by convection through the conduit 28 to increase the efficiency of the heat transfer operation.

It is contemplated that in certain applications, the water inlet 7 can be disposed in direct alignment with the horizontal leg 29 of conduit 28, as shown in FIG. 1. With this arrangement, when heated water is drawn from the tank, incoming cold water will enter through inlet 7 and be introduced directly into the conduit 28. Inlet 7 can also be mounted in the lower portion of tank 2 beneath the level of heating unit 9. During standby periods, when no water draws are being made, the heated water within tank 2 will circulate by convection through the conduit 28.

Figure 4:
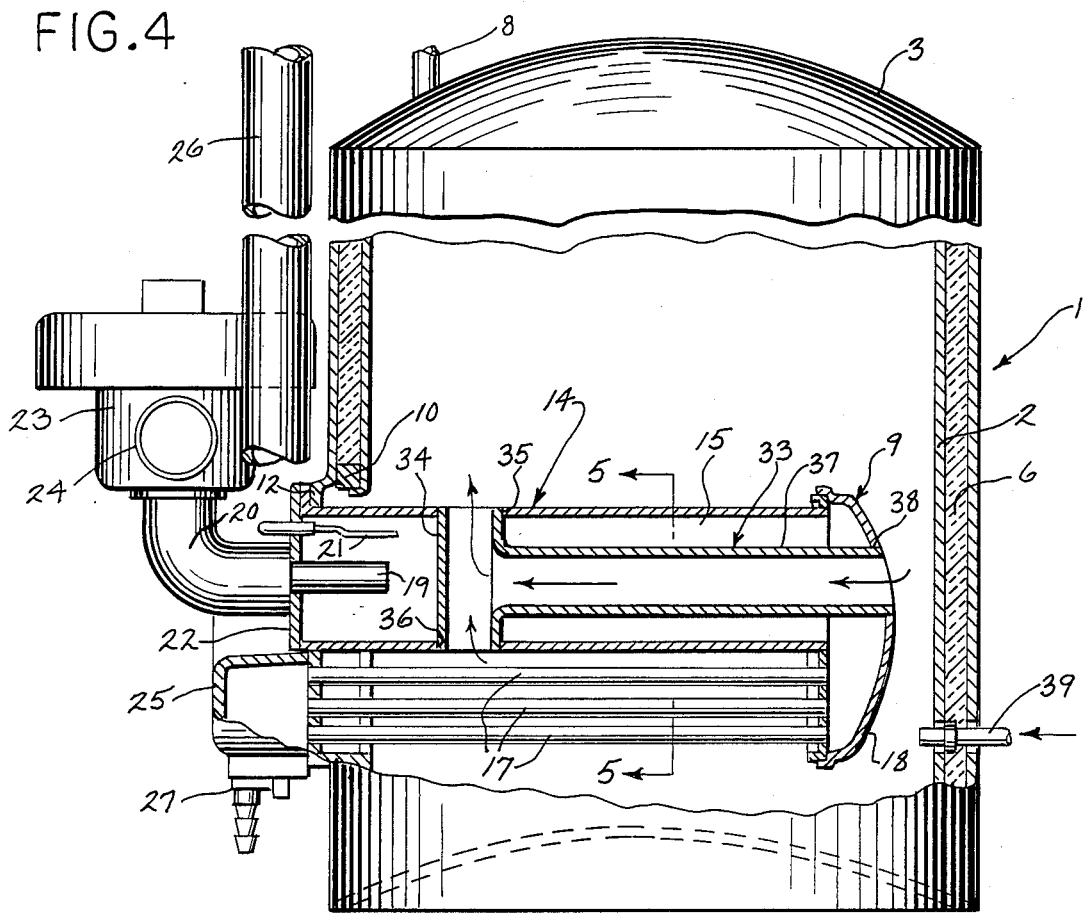
FIG. 4 is a side elevation of a modified form of a water heater incorporating the heating unit of the invention with parts broken away in section.
Figure 5:
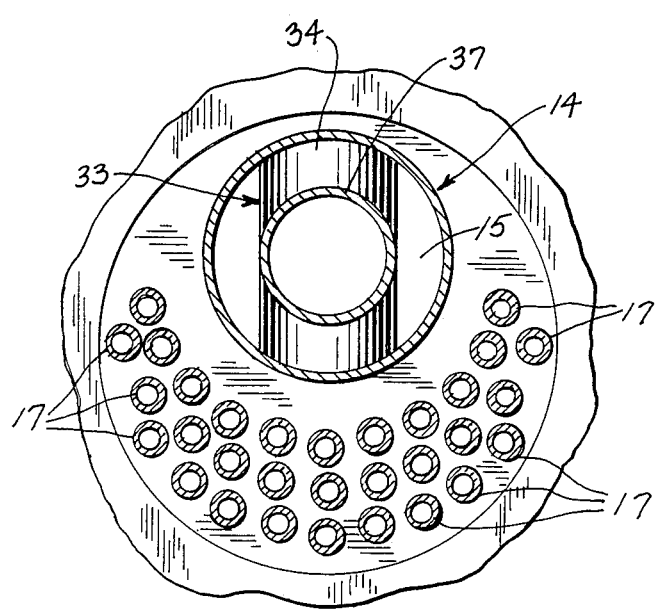
FIG. 5 is a section taken along line 5—5 of FIG. 4.

FIGS. 4 and 5 show a modified form of the invention in which a generally T-shaped conduit 33 is incorporated with the tubular member 14. Conduit 33 includes a leg 34 that extends generally vertically through the combustion chamber 15 and the ends of leg 34 are welded within openings 35 and 36, respectively, in tubular member 14. T-shaped conduit 33 also includes a generally horizontal leg 37 having one end communicating with vertical leg 34 and the other end secured within an opening 38 in deflector 18.

In the embodiment of FIGS. 4 and 5, the water inlet pipe 39 is shown being connected in an opening in the lower portion of tank 2.

In operation, water will flow by convection upwardly through the vertical leg 34 and will also flow inwardly through horizontal leg 37 to vertical leg 34 for exit through the upper end of the vertical leg. The flow of water by convection through the conduit 33 will substantially increase the rate of heat transfer to the water in tank 2 as well as reducing stratification.

While the drawings illustrate a single conduit having a generally L-shaped or T-shaped configuration, it is contemplated that a plurality of conduits can be utilized and the conduit or conduits can take various configurations. However, to obtain circulation through the conduit by convection, one of the ends of the conduit should be located at a higher level than the other.

Similarly, the tubular member 14 that defines combustion chamber 15, is illustrated as being elongated and extending horizontally across the tank 2. It is apparent that the tubular member 14 can have different mounting arrangements and configurations, as for example, the tubular member can be mounted within an opening in the lower head and extend vertically into the tank.

Various modes of carrying out the invention are contemplated as being within the scope of the following claims particularly pointing out and distinctly claiming the subject matter which is regarded as the invention.

I claim:

1. In a water heating apparatus, a tank to contain water to be heated, a hollow member disposed within the tank in contact with said water and defining a combustion chamber, burner means for burning a combustible mixture of fuel and air and having an outlet disposed in said combustion chamber, discharge means for discharging products of combustion from said chamber, and conduit means extending through said combustion chamber and having a pair of ends communicating with the interior of said tank, the interior of said conduit means being disposed out of communication with said combustion chamber and being constructed and arranged so that water from the tank will flow by convection through said conduit means, a portion of said conduit means being disposed in spaced direct alignment with said outlet, said portion being constructed and arranged to deflect said products of combustion outwardly toward the wall of said combustion chamber.

2. The apparatus of claim 1, wherein said outlet faces longitudinally of said combustion chamber and said portion of said conduit extends transversely of said combustion chamber.

3. The apparatus of claim 1, wherein said combustion chamber is elongated and includes a generally cylindrical side wall and an inner end wall enclosing the inner end of said side wall.

4. The apparatus of claim 3, wherein said conduit means includes a first leg extending longitudinally of said combustion chamber and disposed within an opening in said end wall and a second leg communicating with the first leg and extending transversely of said combustion chamber and disposed within an opening in said side wall, said second leg disposed in alignment with the outlet of said burner and constituting said portion.

5. In a water heating apparatus, a tank to contain water to be heated, a hollow elongated member disposed within the tank in contact with the water and defining a combustion chamber, said hollow member including a side wall and an inner end wall enclosing the inner end of said side wall, burner means disposed within said combustion chamber for burning a combustible mixture of fuel and air, discharge means for discharging the products of combustion from said combustion chamber, and conduit means extending through said combustion chamber, said conduit means being generally L-shaped and including a first leg extending longitudinally of said hollow member and disposed within an opening in said end wall, said conduit means also including a second leg communicating with said first leg and extending transversely of said combustion chamber and disposed within an opening in said side wall, said conduit means being constructed and arranged so that water in the tank will flow by convection through said conduit means.

6. In a water heating apparatus, a tank to contain water to be heated, a hollow elongated member disposed within the tank in contact with the water and defining a combustion chamber, said hollow member including a side wall and an inner end wall enclosing the inner end of said side wall, burner means disposed within said combustion chamber for burning a combustible mixture of fuel and air, discharge means for discharging the products of combustion from said combustion chamber, and conduit means extending through said combustion chamber and having a generally T-shape, said conduit means including a first leg disposed longitudinally of said combustion chamber and disposed within an opening in said end wall, said conduit means also including a second leg communicating with said first leg and extending transversely across said combustion chamber, with the ends of said second leg being disposed in aligned openings in said side wall, said conduit means being constructed and arranged so that water in the tank will flow by convection through said conduit means.

7. In a water heating apparatus, a tank to contain water to be heated, an elongated tubular member disposed within an opening in said tank and located in the lower portion of said tank, said tubular member defining a combustion chamber, said tubular member including a generally cylindrical side wall and an inner end wall enclosing the inner end of said side wall, a burner disposed within said combustion chamber, supply means for supplying a mixture of fuel and air to said burner, said mixture being ignited to generate waste gases of combustion, discharge means for discharging said waste gases from said combustion chamber, conduit means disposed within said combustion chamber and having a pair of ends communicating with the interior of said tank, said conduit means having a first end disposed in said end wall and having a second end disposed in said side wall and inlet means for introducing water to said tank, said inlet means being disposed in alignment with the first end of said conduit means whereby water entering the tank through said inlet means is directed into said conduit means.

* * * * *